(12) United States Patent
Itou et al.

(10) Patent No.: US 6,560,092 B2
(45) Date of Patent: May 6, 2003

(54) INFORMATION PROCESSING EQUIPMENT

(75) Inventors: Ryuichi Itou, Hitachinaka (JP); Makoto Sato, Hitachiota (JP); Tatsuo Onodera, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 100 days.

(21) Appl. No.: 09/811,603

(22) Filed: Mar. 20, 2001

(65) Prior Publication Data

US 2001/0048586 A1 Dec. 6, 2001

(30) Foreign Application Priority Data

May 24, 2000 (JP) ........................................ 2000-157950

(51) Int. Cl.[7] ................................................ G06F 1/16
(52) U.S. Cl. ........................ 361/681; 361/683; 361/685; 312/223.1; 108/43
(58) Field of Search ................................ 361/680–683, 361/724; 312/223.1, 223.2; 345/156, 173, 179, 905

(56) References Cited

U.S. PATENT DOCUMENTS

| | | | | |
|---|---|---|---|---|
| 5,796,575 A | * | 8/1998 | Podwalny et al. | 361/681 |
| 5,825,617 A | * | 10/1998 | Kochis et al. | 361/686 |
| 6,028,765 A | * | 2/2000 | Swindler et al. | 361/683 |
| 6,101,086 A | * | 8/2000 | Kim et al. | 361/683 |
| 6,101,087 A | * | 8/2000 | Sutton et al. | 361/686 |
| 6,134,102 A | * | 10/2000 | Worn et al. | 361/680 |
| 6,144,552 A | * | 11/2000 | Whitcher et al. | 361/681 |
| 6,282,082 B1 | * | 8/2001 | Armitage | 361/681 |

* cited by examiner

Primary Examiner—Gerald Tolin
Assistant Examiner—Michael Datskovskiy
(74) Attorney, Agent, or Firm—Antonelli, Terry, Stout & Kraus, LLP (57) ABSTRACT

An object of the present invention is to provide an information processing equipment which is excellent in the shock resistance, and has a strap and pen storing portion, and has a drip-proof ability.

The information processing equipment 1 is constructed by putting a lower case 2 as the base and successively stacking a main board 3, a chassis 4, an LCD 5, a touch panel 6, a packing 7 and an upper case 10 in this order. A battery 11 for driving the equipment is provided and is detachable from the lower portion of the lower case 2.

Further, an inverter board 14 for driving the LCD 5, a flexible cable 15 and an inverter cushion 18 is arranged in a position in the upper portion of the chassis 4 and beside a speaker 12. The flexible cable 15 from the main board 3 is connected to the inverter board 14, and a lead wire of the LCD 5 is connected to the inverter board 14.

6 Claims, 12 Drawing Sheets

INFORMATION PROCESSING EQUIPMENT

BACKGROUND OF THE INVENTION

1. Field of the Invention

The present invention relates to a potable information processing equipment, and particularly to an information processing equipment which can be used outdoors, and has a shock resistance structure and a drip-proof structure in regard to preventing water from entering into the inside of the equipment.

2. Description of the Prior Art

Information processing equipments of the conventional technology, which are designed by taking into consideration a shock caused by dropping during using or carrying it, can be roughly classified into two kinds. One kind is an information processing equipment which has a shock absorbing member in its main body portion. The information processing equipment of this kind has the shock absorbing member or a soft elastic body such as a rubber sheet or a cushion around its main body. Another means has a structure which can be attached to and detached from the main body. Some of them cover over the whole equipment, and the others partially cover the equipment. Various kinds of structures are proposed and practically used.

An information processing equipment of this kind having grip portions in both sides is proposed in Japanese Patent Application Laid-Open No. 11-110071.

On the other hand, as the conventional technology in regard to the drip-proof, methods of performing drip-proof treatment between a periphery of a screen frame and a display screen are disclosed in Japanese Patent Application Laid-Open No. 7-168646 and in Japanese Patent Application Laid-Open No. 7-168650.

Further, as a strap capable of being set to the information processing equipment, a strap holder structure for a potable information processing equipment is disclosed in Japanese Patent Application Laid-Open No. 5-191075.

In the conventional technology, an inverter board is directly fixed to a chassis with screws. Therefore, when a shock acts on the equipment, for example, the equipment falls down, a load locally acts on the screw-fastened portion to damage the board. As a method of solving these problems, a well-known technology of means to absorb vibration and shock acting on the board using an elastic sheet member is disclosed in Japanese Patent Application Laid-Open No. 11-307960.

In the information processing equipments having both of the structures for a shock resistance structure and a drip-proof structure in regard to preventing water from entering into the equipment in the conventional technology, a large amount of man-power and cost have been required when a strap attaching position and a pen storing position are modified, or the shock resistance is further improved or newly developed. Further, in the equipment of Japanese Patent Application Laid-Open No. 7-168646, since positioning of the packing bonded onto the upper case (an inner member) is not considered, the bonding position of the packing may be displaced when the equipment is assembled. Although an idea to improve the maintainability without bonding the packing is proposed in the reference, the maintainability in the field has a problem in that the position of packing can not be determined without bonding or temporally fixing the packing onto any one of the components. The equipment of Japanese Patent Application Laid-Open No. 7-168650 needs to form the packing shape so as to meet with the periphery of the screen frame groove of the upper case, and accordingly it is not so easy to absorb a difference between the part dimensions of the packing and the upper case. In addition, there is a problem in cost because the shape of the packing becomes complicated.

A weight of the equipment main body acts on a strap shaft used for carrying the equipment, and a load larger than several times of the weight directly acts on the strap shaft during handling. Therefore, deformation is apt to occur in positions where the upper case and the lower case must be closely contact to each other to form a labyrinth for the purpose of the drip-proof. In order to make the strap easily pass through and to form the inside of the main body in a drip-proof structure, an essential means for coupling the upper case and the lower case needs to be provided in a position near the strap shaft inside the main body.

Further, in the reference, very large projections are provided in corner positions. Therefore, it is difficult to say that the equipment is excellent in operability of the screen because hand or arm of the operator may touches onto the projection during operating the equipment on the screen. Further, there is a problem in that the projections are obstacles when the equipment is being carried.

Furthermore, in the equipment of Japanese Patent Application Laid-Open No. 7-168647, the pen storing portion is arranged in the upper case, and is depressed toward the inside of the main body. Therefore, there is also a problem in that the mounting efficiency of the contained parts is decreased by the pen storing portion.

SUMMARY OF THE INVENTION

An object of the present invention is to provide an information processing equipment which is excellent in the shock resistance, and has a strap and pen storing portion, and has a drip-proof ability.

In the present invention, a labyrinth is provided in the whole periphery of the engaging portion of the upper case and the lower case, and a strap is passed through four corner portions, and screw bosses for joining the upper case with the lower case serve as strap shafts, and bosses for fixing the upper case and the lower case are provided at positions near the strap shafts inside the equipment with respect to the boundary of the labyrinth.

Grips having a multiple structure formed of different kind material members are attached to side surfaces of the main body portion which is formed by coupling the upper case and the lower case to each other. In the grip, a hole is formed in a corner portion of a part corresponding to a core. Further, a pen storing portion uses a space formed by coupling the upper case and the grip. Furthermore, the inverter board is wrapped with a cushion member.

According to the structure described above, the labyrinth structure formed by coupling the upper case and the lower case prevents water from entering into the inside of the instrument. Since the strap portions provided in the four corners are outside of the labyrinth, water can not enter into the inside of the instrument through the strap holes.

The multiple structure of the grip is intended to absorb a chock. That is, a shock caused by falling from the corner portion is absorbed by deforming the grip portion because there is the hole in the part corresponding to the core. Further, by using the space formed by coupling the upper case and the lower case, the size of the main body can be made small without providing a special space for the pen storing portion. Furthermore, since the inverter board is supported by the cushion member, a local load to the board can be reduced smaller compared to a shock when the board is fixed with screws, and accordingly the equipment can withstand a large shock.

DESCRIPTION OF THE PREFERRED EMBODIMENTS

An embodiment of the present invention will be described below.

Figure 1:
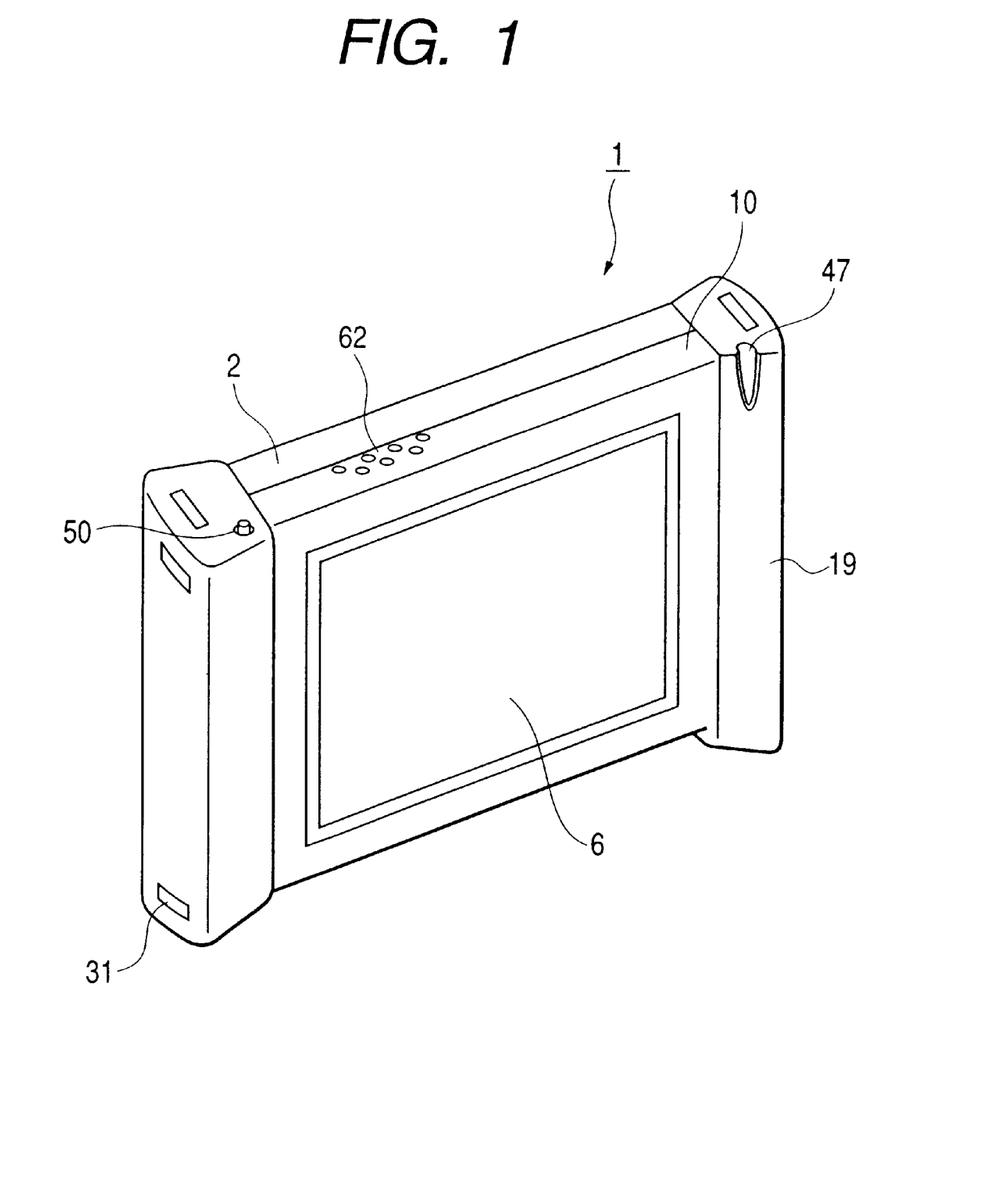
FIG. 1 is a perspective view showing the outer appearance of an information processing equipment in accordance with the present invention.

FIG. 1 is a view showing the outer appearance of an information processing equipment in accordance with the present invention. The information processing equipment 1 is composed of an upper case 10, a lower case 2 and grips 19. The structure will be described below in detail, referring to FIG. 2 and the following drawings.

Figure 2:
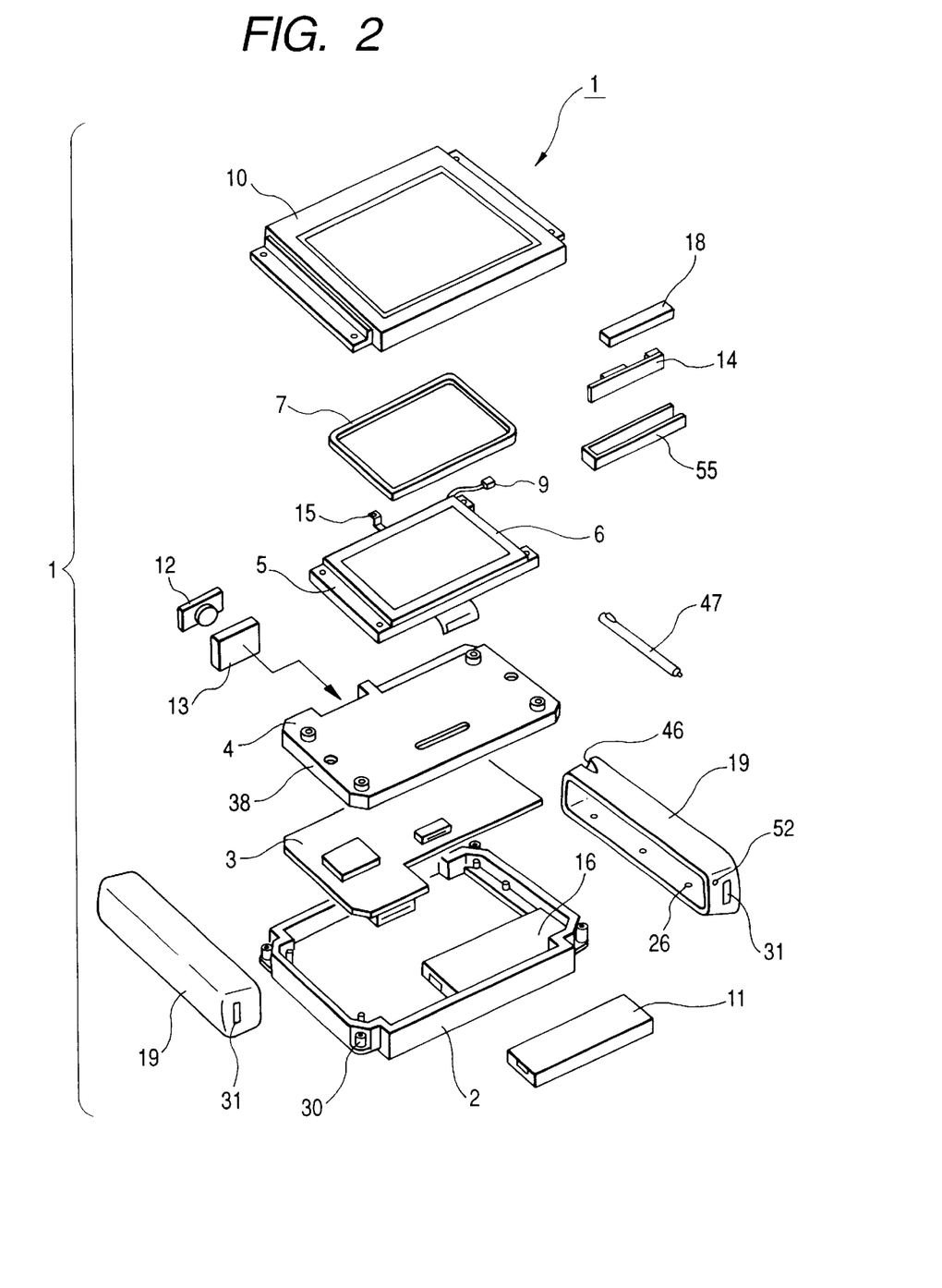
FIG. 2 is a perspective exploded view showing the information processing equipment.
Figure 3:
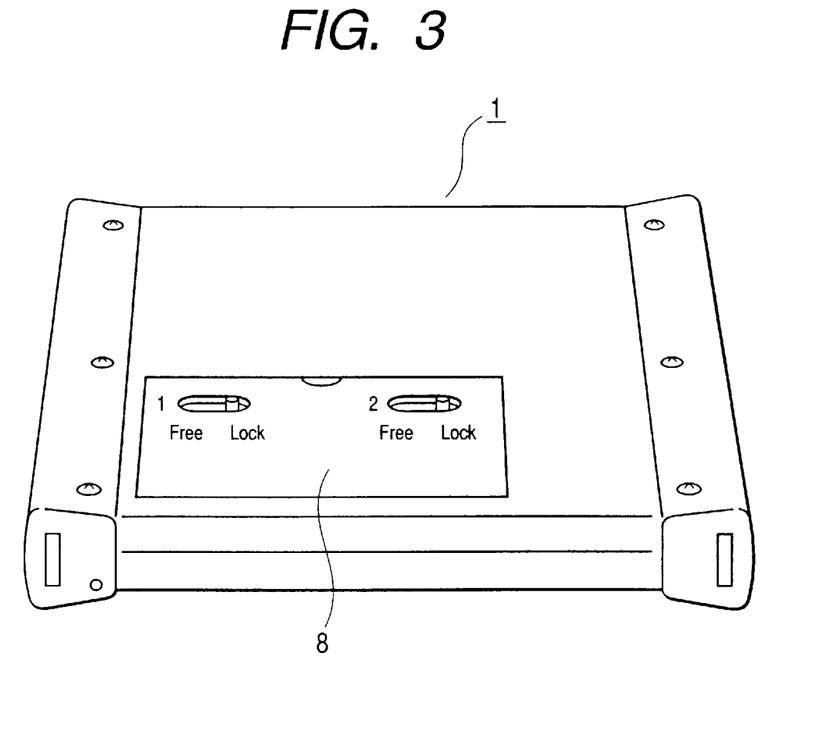
FIG. 3 is a perspective view showing the outer appearance of a battery cover.

The information processing equipment 1 is formed in a stacking structure by successively putting a main board 3 for controlling the information processing equipment 1 on the lower case 2; a chassis 4 for fixing an LCD 5; the LCD 5; a touch panel 6 placed on the upper portion of the LCD 5; a packing 7 placed between the touch panel 6 and the upper case 10, the packing preventing water from entering from the periphery of the screen of the upper case into the outside of the main body; and the upper case 10 in this order. A battery 11 for driving the information processing equipment 1 and a battery case 16 are provided in the lower case 2, and the battery case 16 is covered with a battery cover 8 as shown in FIG. 3. Thus, the information processing equipment 1 is constructed.

The battery cover 8 has lock switches in two positions, and the wordings on the battery cover 8 are switch 1 and switch 2. There is no problem when the batter is loaded, but when the battery is unloaded, a very short time period for once storing information in the information processing instrument to a memory on the main board is required. Therefore, the time period is secured by providing a plurality of buttons in the batter cover 8 so that the power source may not instantaneously cut off.

Figure 4:
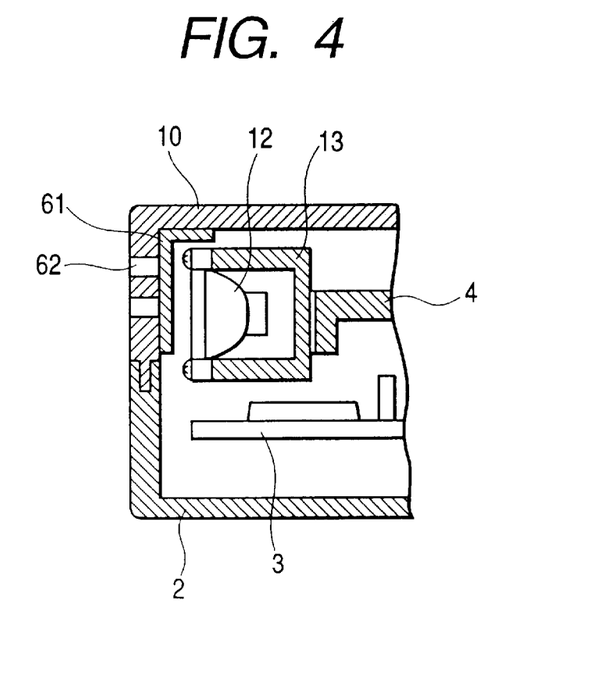
FIG. 4 is a cross-sectional view showing a speaker.

A speaker 12 for sounding operation sound to the operator and a speaker piece 13 for fixing the speaker 12 are provided in a space formed by partially cutting off a part of the chassis 4, and are placed in a direction of an arrow marked near the speaker piece and mounted in an appropriate direction so as to give forth the sound outside the information processing equipment 1. Further, sound holes 62 are provided at a position opposite to the speaker 12 as shown in FIG. 4, and a porous waterproof sheet 61 is provided in the inside of that position to prevent water from entering (hereinafter referred to as drip-proof) and to give forth the sound generated in the information processing equipment to the operator.

The inverter board 14 for driving the LCD 5, the flexible cable 15 and the inverter cushion 18 are arranged in a position in the upper portion of the chassis 4 and beside the speaker 12. The flexible cable 15 from the main board 3 is connected to the inverter board 14, and a lead wire of the LCD 5 is connected to the inverter board 14.

In regard to the boundary between the touch panel 6 and the upper case 10, the packing 7 is provided around the inside screen frame of the upper case 10, and is placed between the upper case 10 and the touch panel 6. This packing 7 seals a gap of about 0.5 mm between the touch panel 6 and the upper case 10 which is an assembling error caused in the periphery of the screen and an intentionally set small gap in the vertical direction.

In this embodiment, the rectangular packing 7 having a dimension slightly smaller (shorter expanded length) than the periphery of the screen frame is inserted around the screen frame of the upper case 10, and therefore the packing 7 is temporally fixed on the upper case 10 at that time. Therefore, the packing 7 can not fall down from the upper case 10, even if the upper case 10 is turned over 180 degrees (the packing 7 is directed to the natural falling direction) during assembling. By doing so, the drip-proof around the screen can be attained even if the shape of the packing 7 is simplified.

Figure 5:
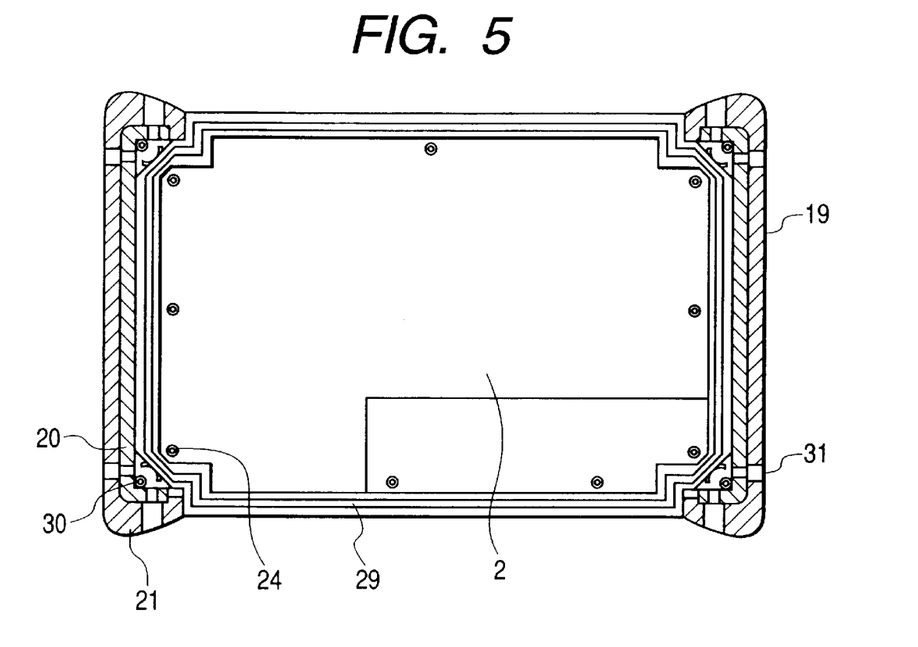
FIG. 5 is a view showing the lower case which is combined with the grips.

FIG. 5 is a cross-sectional view showing the information processing equipment 1 in which after coupling the upper case and the lower case, the grips 19 are inserted over the upper case and the lower case.

Figure 6:
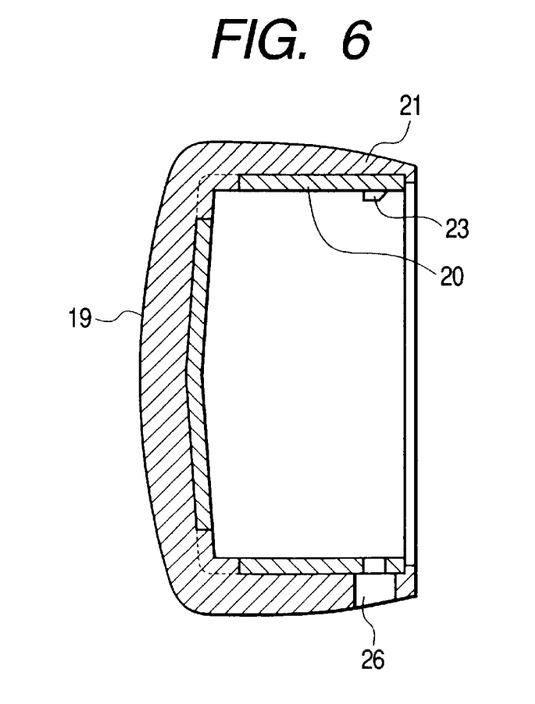
FIG. 6 is a cross-sectional view showing the grip.

The grip 19 shown in FIG. 6 has a double structure, that is, the inner side is a grip core 20 made of a resin and serving as a core member of the part; and the outer side is made of an elastomer 21 having a hardness lower than that of the grip core. The reason why the grip 19 is not a simple unit only made of the elastomer 21 is that the grip only made of the elastomer can not be directly fixed with screws or with hooks because the elastomer has a soft plastic property, and accordingly it is difficult to secure the reliability. Therefore, the elastomer 21 is used in the external part of the information processing equipment in the form of the complex part with the grip core 20.

There are various method of forming the outer part of elestomer 21 on the grip core 20, such as a double molding method (a method of molding by rotating a movable side in a single mold), an insert molding method (a grip core is molded using one mold in advance, and then an elastomer part is molded using another mold), and a method of bonding the parts. However, the present invention does not limit the fabricating method of the grip itself, and does not limit their materials. That is, the elastomer 21 is used for the grip 19, but a soft elastic material such as rubber may be used, and the fabricating method of the grip 19 is not limited.

Figure 7A:
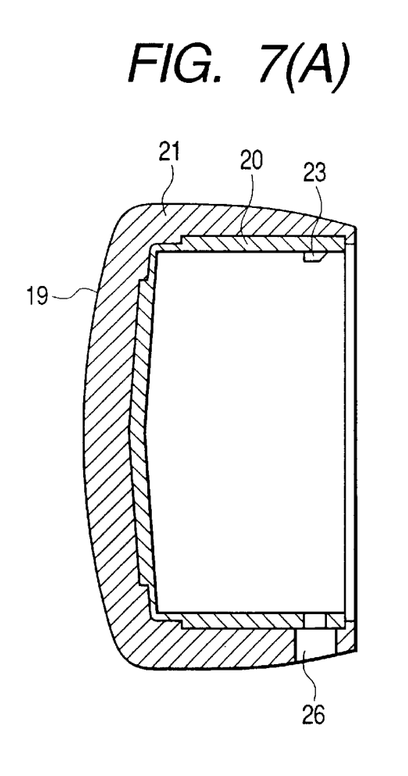
FIG. 7 is a view showing other embodiments of grips in accordance with the present invention.
Figure 7B:
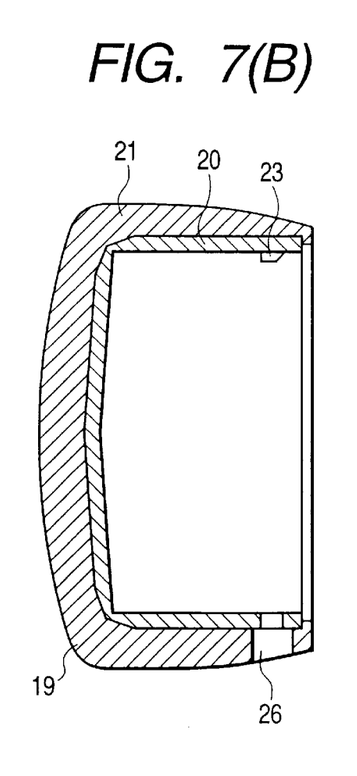
Figure 8:
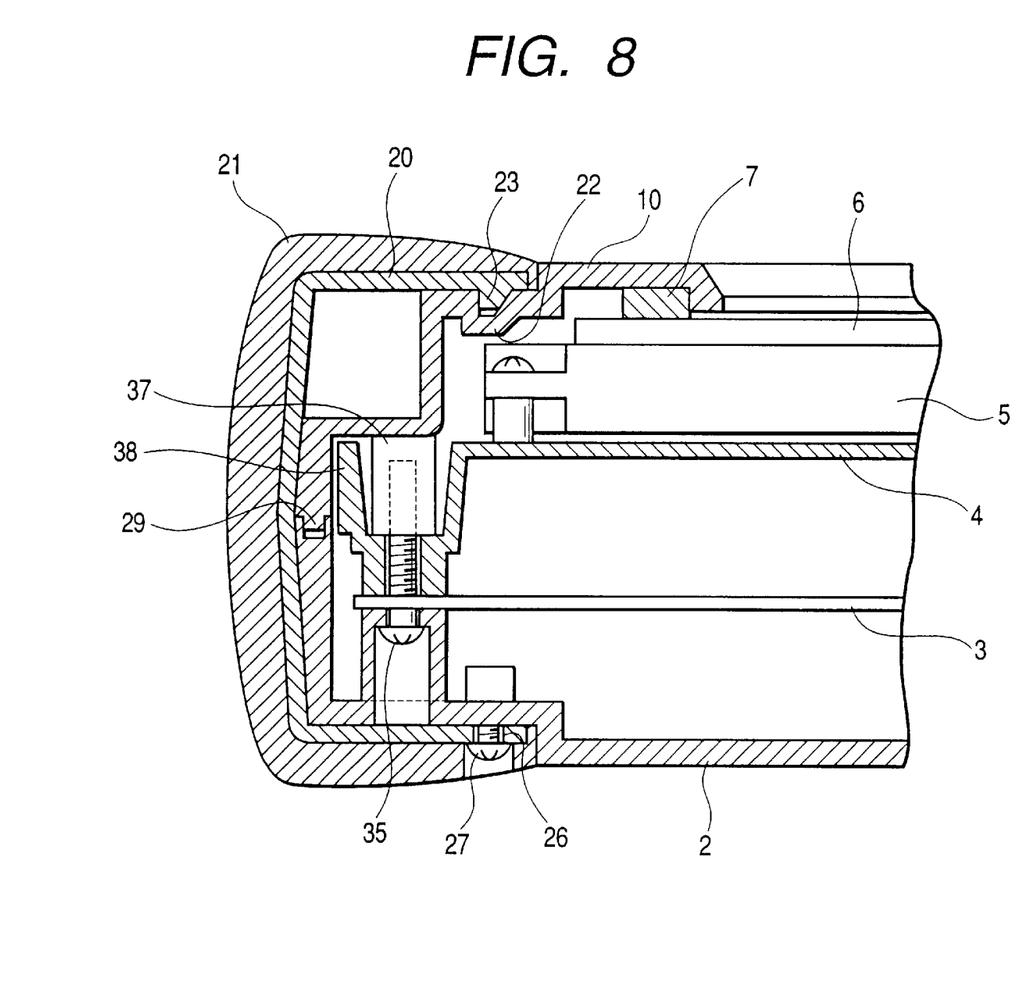
FIG. 8 is a cross-sectional view showing the left hand side of the information processing equipment.

On the inner side of each of grip cores shown in FIG. 7 and FIG. 8, a hook 23 for engaging with a depression 22 (refer to FIG. 8) in the upper case 10 is formed, and a screw hole 26 for screwing to the lower case 2 is formed in the side opposite to the hook. In order to fix the grip 19 to the main body portion 28, the grip core 20 must be fixed to the main body portion 28 with the screw because the grip 19 has the elastomer 21. By taking the screw cap into consideration, the diameter of the screw hole 26 in the elestomer portion 21 of the grip 19 is formed larger than the diameter of the screw hole 26 in the grip core 20. When the grip 19 is assembled to the main body portion 28, the hook 23 is inserted into the depression 22 in the upper case and then the grip 19 is fastened to the main body portion 28 with screw. Therefore, the grip 19 is not easily detached from the main body portion 28. When an operator operates the information processing equipment by holding the grip 19, a force acts in a direction so as to make the hook 23 on the inside of the grip core 20 further enter into the depression 22. In addition, the screwing is performed from downside toward upside though the grip 19 is attached to the main body portion from the horizontal direction. Therefore, the grip 19 is not easily detached from the main body portion 28.

Since the grip 19 in the present embodiment is molded with elastomer 21, the shock resistance of the main body 28 is higher compared to that of a main body having grips simply made of resin such as ABS or styrene resin. For example, when the information processing equipment is erroneously dropped on a floor, the shock of drop can be absorbed because the grips 19 are projected to all the directions of the surfaces, the edges and the corners of the upper case 10 and the lower case 2 (refer to FIG. 3).

Figure 9A:
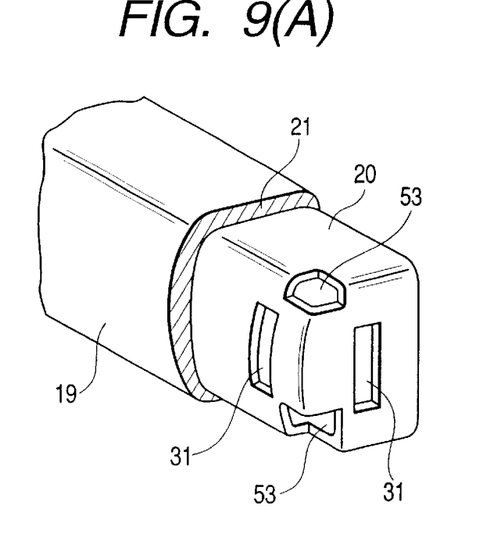
FIG. 9 is a partially sectional view showing the outer appearances of the grip portions.
Figure 9B:
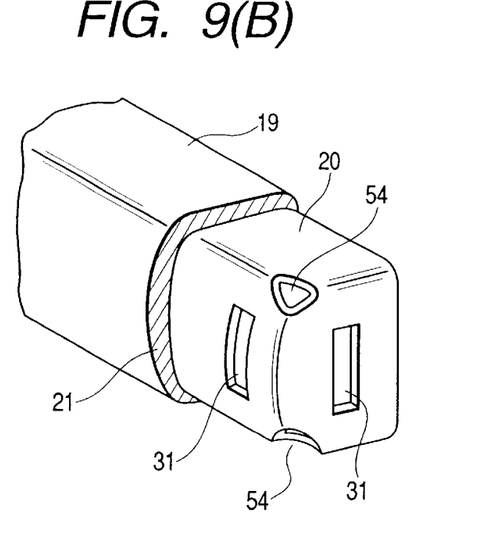

In order to reduce the shock to the corner portions on which a large impact locally acts, a square hole 53 or a round hole 54 is formed in each of the corner portions in the grip core 20, as shown in FIGS. 9 (A) and (B). By doing so, the thickness of the elastomer member 21 covering at the portions outside the holes can be increased without increasing the outer dimension of the grip 19, and accordingly the shock absorbing power can be substantially improved.

Therefore, there is an effect in that the thickness of the elastomer member 21 covering at the portions outside the holes can be increased without making the shapes of the upper case 10 and the grip 19 complicated because the space between the upper case 10 and the grip 19 is used.

Further, as another embodiment, since the thickness of the elastomer member 21 may be made thicker by adjusting the thickness of the corner portion of the grip core 20, there is an effect that in the shock absorbing power can be substantially improved compared to that of a conventional primary side molding product having a simple uniform thickness. Furthermore, after coupling the upper case 10 and lower case 2 to each other, the grips 19 are fit into the assembled upper and lower cases from both side and then fastened with screws. Therefore, there is no need to say that the drip-proof structure of the main body portion 28 is completed regardless of the shapes of the grip 19 and the grip core 20.

Figure 10:
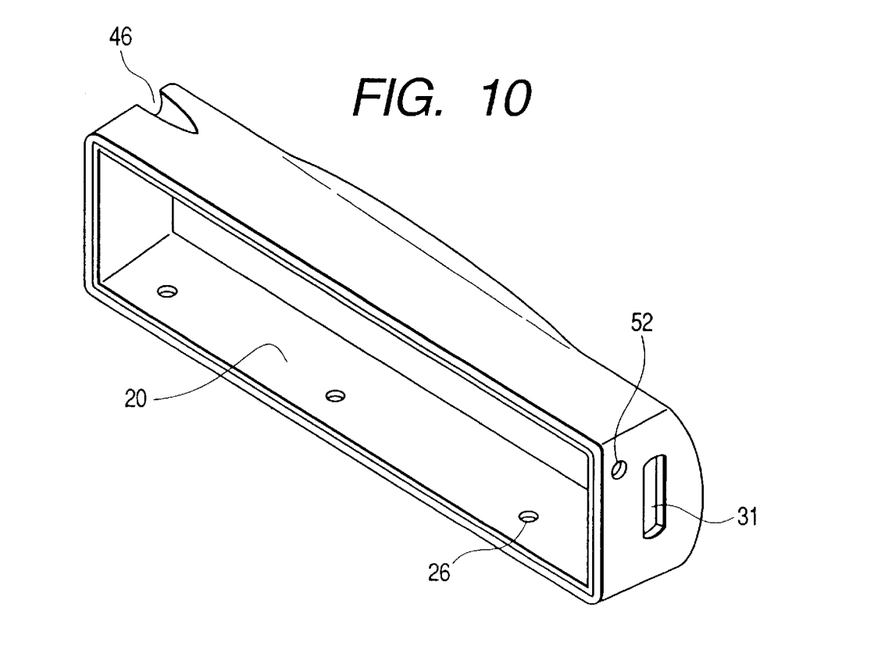
FIG. 10 is a view showing another embodiment of a grip in accordance with the present invention.

Further, since the grips 19 are parts independent of the upper case 10 and the lower case 2, the grips 19 may be easily formed in a specified shape and color depending on the purpose. FIG. 10 shows a shape of the grip central part of which is swelled so as to fit to the shape of hand. By changing the outer shape of the grip, the manufacturer can cope with requirement of easy-to-use grip and requirement of falling-shock resistance. Therefore, there is an effect in that the shape of the grip can be easily varied coping with various kinds of use conditions and depending on the purpose of user's requirement.

In the present invention, the total form of the information processing equipment can be made sleek without forming a large projections in the corner positions because the holes are provided in the corner portions of the grip core 20 and the elastomer member 21 can absorb a large shock. Therefore, the grip does interrupt operation of a user even when the user variously operates the information processing equipment.

Figure 11:
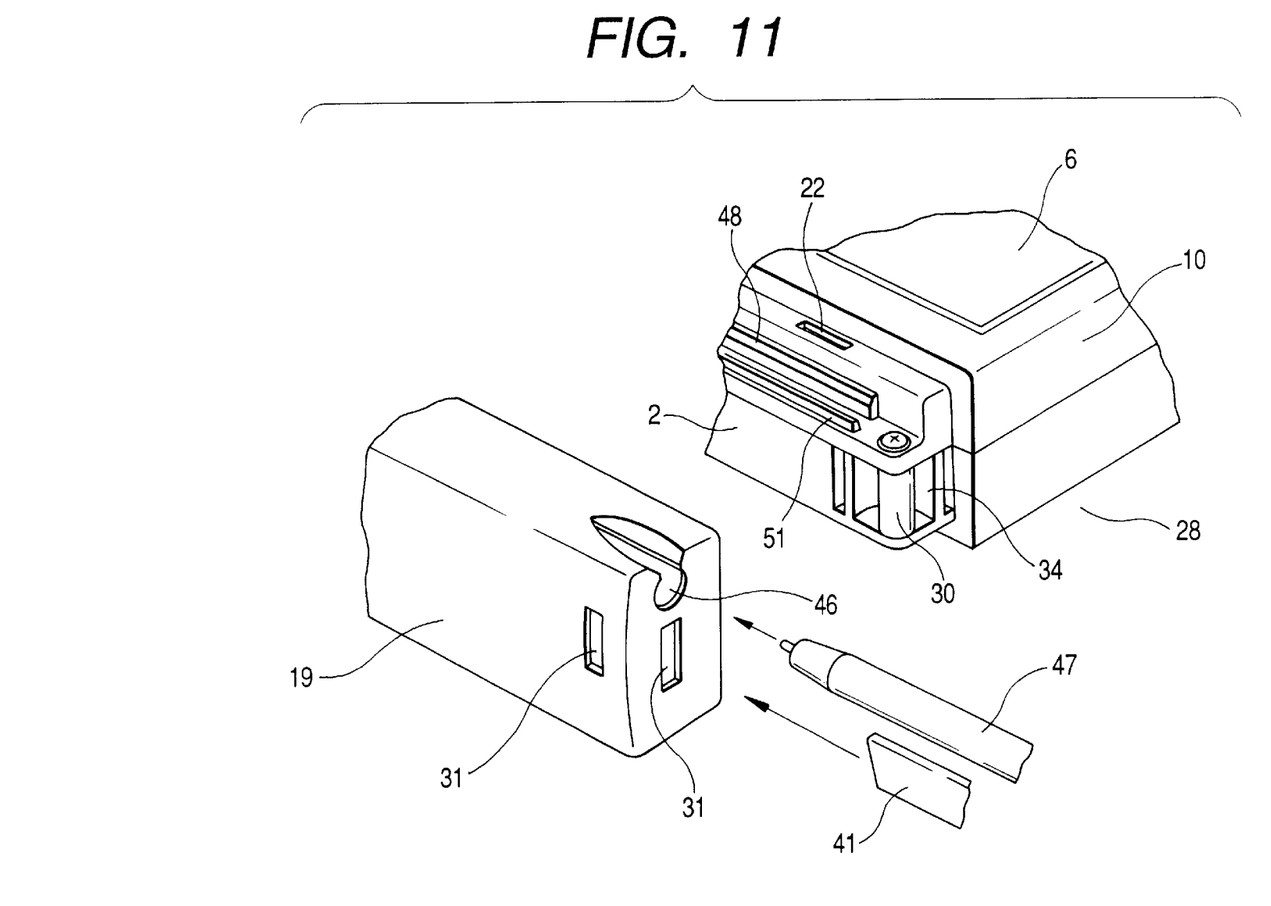
FIG. 11 is a view showing the right hand side of the main body.

An embodiment of a strap in accordance with the present invention will be described below, referring to FIG. 11 to FIG. 13. As shown in FIG. 11, the labyrinth structure 29 (refer to FIG. 5) is formed in the whole periphery of the coupling portion of the upper case 10 and the lower case 2, and the corner portion of the coupling portion of the upper case 10 and the lower case 2 is formed in a shape capable of making the strap 41 pass through there and capable of coupling the upper case 10 and the lower case 2.

Holes 31 capable of making the strap 41 pass through there are provided in the grip 19 at positions corresponding to a strap shat 30 provided in the lower case 2, and number of the holes for each strap shaft is two. When the operator attaches the strap 41 to the information processing equipment, the strap 41 can be attached to the information processing equipment by that the strap 41 is passed through from the hole 31 of the grip 19 between the strap shaft 30 and a limb 34, and is drawn from the hole 31 of the grip 19 to turn the strap 41 around the periphery of the strap shaft 30.

Figure 12:
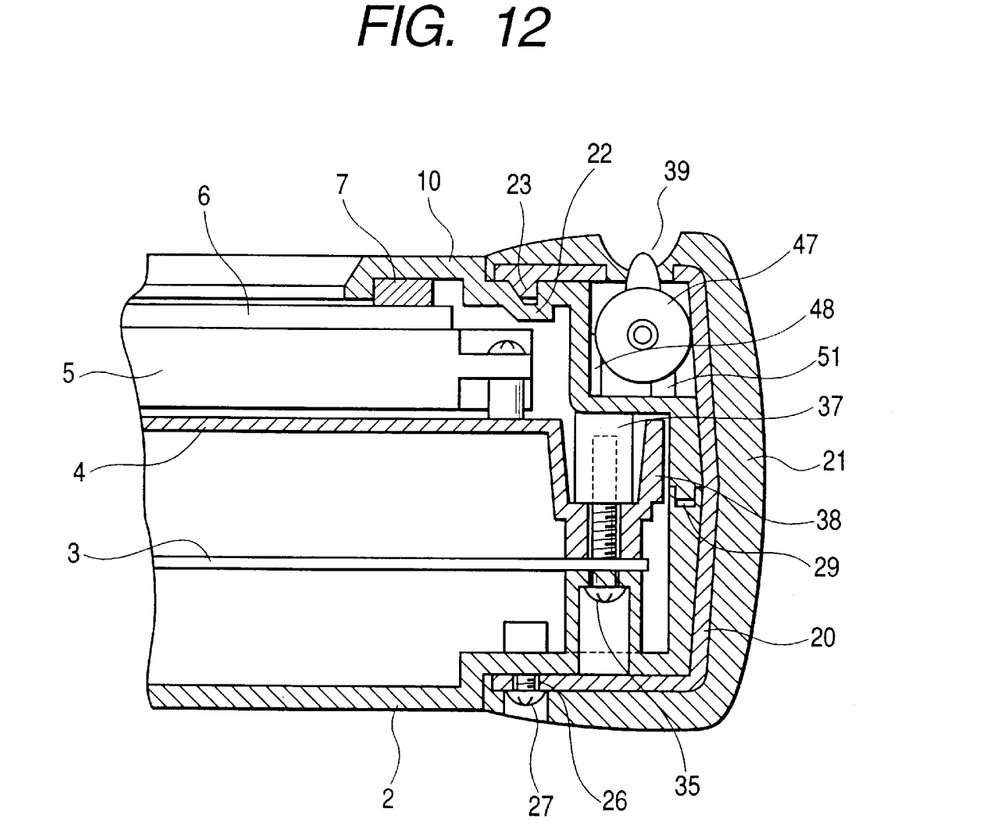
FIG. 12 is a cross-sectional view showing the upper right side of the information processing equipment in a state of storing the pen.
Figure 13:
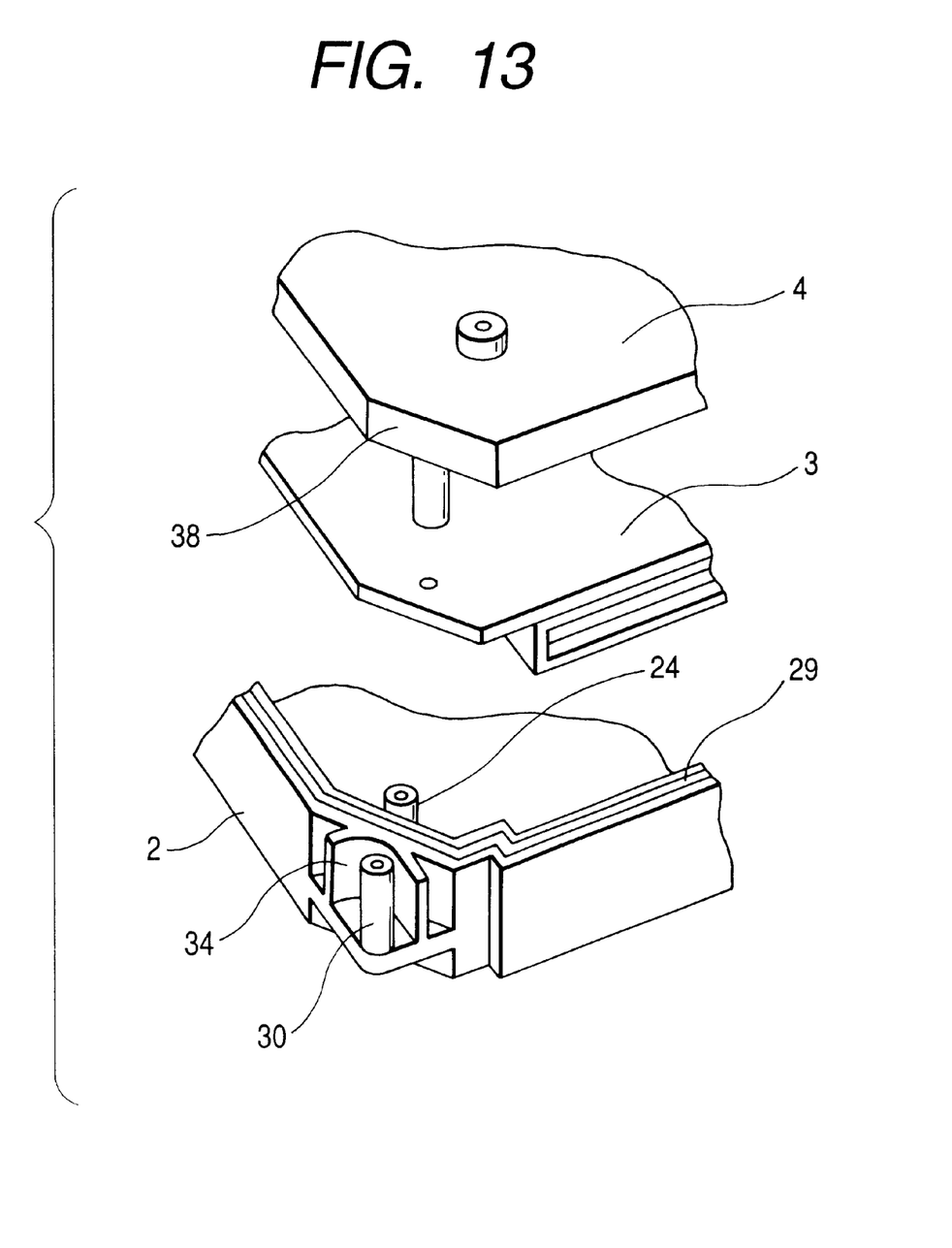
FIG. 13 is a perspective view showing the lower left side corner portion of the lower case.
Figure 14:
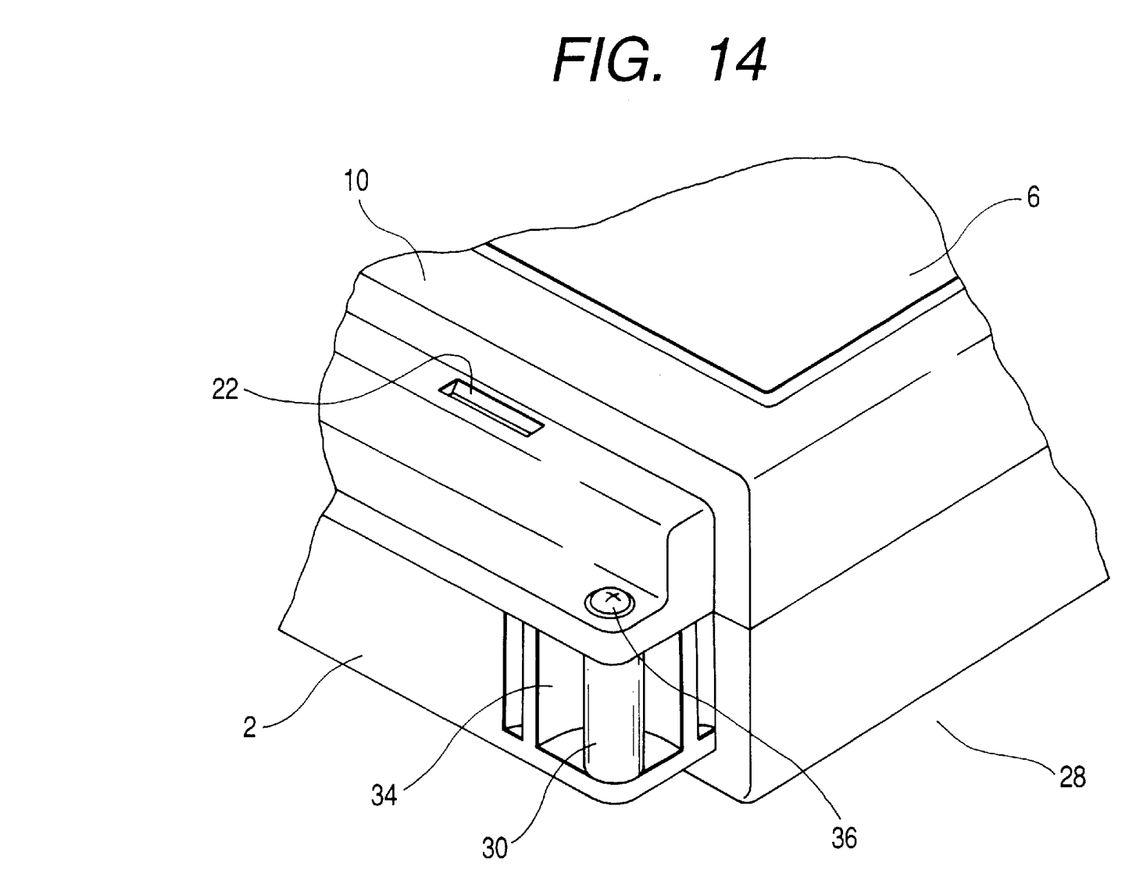
FIG. 14 is a perspective view showing the lower left side corner portion of the main body.

In the present invention, the upper case 10 is fixed to the lower case 2 using screws 35, as shown in FIG. 12 and FIG. 14. In each of the portions of the corner portions where the strap 41 pass through, the upper case 10 and the lower case 2 are fixed to each other from the upper case 10 side with a screw 36 using the shaft for passing the strap 41, that is, the strap shaft 30 as the boss in the outside with respect to the boundary of the labyrinth.

The reason why the screw 36 is screwed from the upper case 10 side is that during the manufacturing process of the information processing equipment, the parts are successively assembled from the lower case 2, and accordingly the portion to be covered with the grip 19 is advantageous to screw from the upper side of the screwing direction of the screw 36 because it can prevent the parts from coming apart in the final work in which the main body portion 28 is turned over and several positions are fastened with screws 35.

Bosses 24 for fixing the upper case 10 and the lower case 2 to each other with screws are provided at positions near the four corners in the inner side of the labyrinth structure 29.

Further, the upper case 10 and the lower case 2 of the information equipment 1 are fastened to each other with screws at positions outside with respect to the boundary of the labyrinth structure 29 (in this case, inside of the grip 19) and inside of the main body portion 28. Therefore, even if an excessively large force acts on the strap shaft 30 arranged outside, the structure can secure a very high strength because there are screws in the inside portion. In addition, since the labyrinth structure 29 has screw fastening positions in the inner portion of the main body 28, the upper case 10 and the lower case 2 does not come apart or part of joined portions do not come apart after receiving a shock or the like. Therefore, the original drip-proof performance can be maintained.

The chassis 4 placed in the inner portion (refer to FIG. 2) also has a shape in which the four corner portions are cut away in the slanting direction so as to meet with the inner shape of the upper case 10 and the lower case 2. The screw 35 screwed from the lower case 2 is screwed to the boss 37 of the upper case 10 through the chassis 4, and part of the chassis 4 is also fixed through the main board 3. Therefore, the structure is very easy to be assembled. The chassis 4 is made of a metal, and when a light metal, for example, such as aluminum or magnesium is employed, an anti-noise effect of the main board can be expected. At the same time, there is an effect in that to instantaneous deformation such as torsion or bending of the information processing equipment caused by a shock, the rigidity of the chassis can be clearly improved compared to a chassis made of a molding resin. Further, by providing an outer peripheral limb 38 of the chassis 4 near the labyrinth structure 29 of the upper case 10 and the lower case 2, the outer peripheral limb 38 prevents deformation due to gaps between the constitutional parts caused by an external force, that is, a compression load or a impact force from propagating to the inner portion. Therefore, the labyrinth structure 29 of the upper case 10 and the lower case 2 can be secured, and accordingly there is an effect in that the drip-proof performance can be maintained.

The pen storing portion 39 of the information processing equipment 1 in accordance with the present invention will be described below.

FIG. 11 and FIG. 12 are a view showing the upper right side of the information processing equipment in a state before attaching the grip, and a partial cross-sectional view showing the central portion of the information processing equipment. The height of the boss 37 of the upper case 10 for coupling the upper case 10 and the lower case 2 can be lowered by forming the grip as a separate part, and accordingly spaces can be made both in the upper case 10 and in the grip 19.

FIG. 12 shows a feature in which the pen 47 is inserted from a pen hole 46 of the grip 10, and a space surrounded by a limb 48 and a limb 51 meeting with the outer shape of the pen 47 provided in the upper case 10 and the inner wall of the grip core 20 is formed to hold the pen 47 at these portions. Even in this case, the strap portion of the corner portion composed of the upper case 10 and the lower case 2 can be formed, and the use can use the information processing equipment 1 with the strap 41. At the same time, since the labyrinth structures provided in the upper case 10 and the lower case 2 are engaged with each other by coupling the upper case 10 and the lower case 2, it is possible to prevent water from entering into the inside of the information processing equipment 1, for example, it is possible to prevent water from entering into the main board 3 and the LCD 5. At that time, water entering through the pen hole 46 provided in the grip 19 is drained through a drain hole 57 (refer to FIG. 10) provided in the lower portion of the grip 19. Therefore, it is possible to prevent water from accumulating between the grip 19 and the upper case 10.

Further, by providing an antenna 50 in the grip opposite to the grip 19 having the pen 47, it is possible to make communication using a small wireless unit.

The present invention has an effect to further increase the part mounting efficiency inside the main body 28 by making use of the space formed by the upper case and the grip 19.

An embodiment of a structure of board in accordance with the present invention will be described below in detail.

Figure 15:
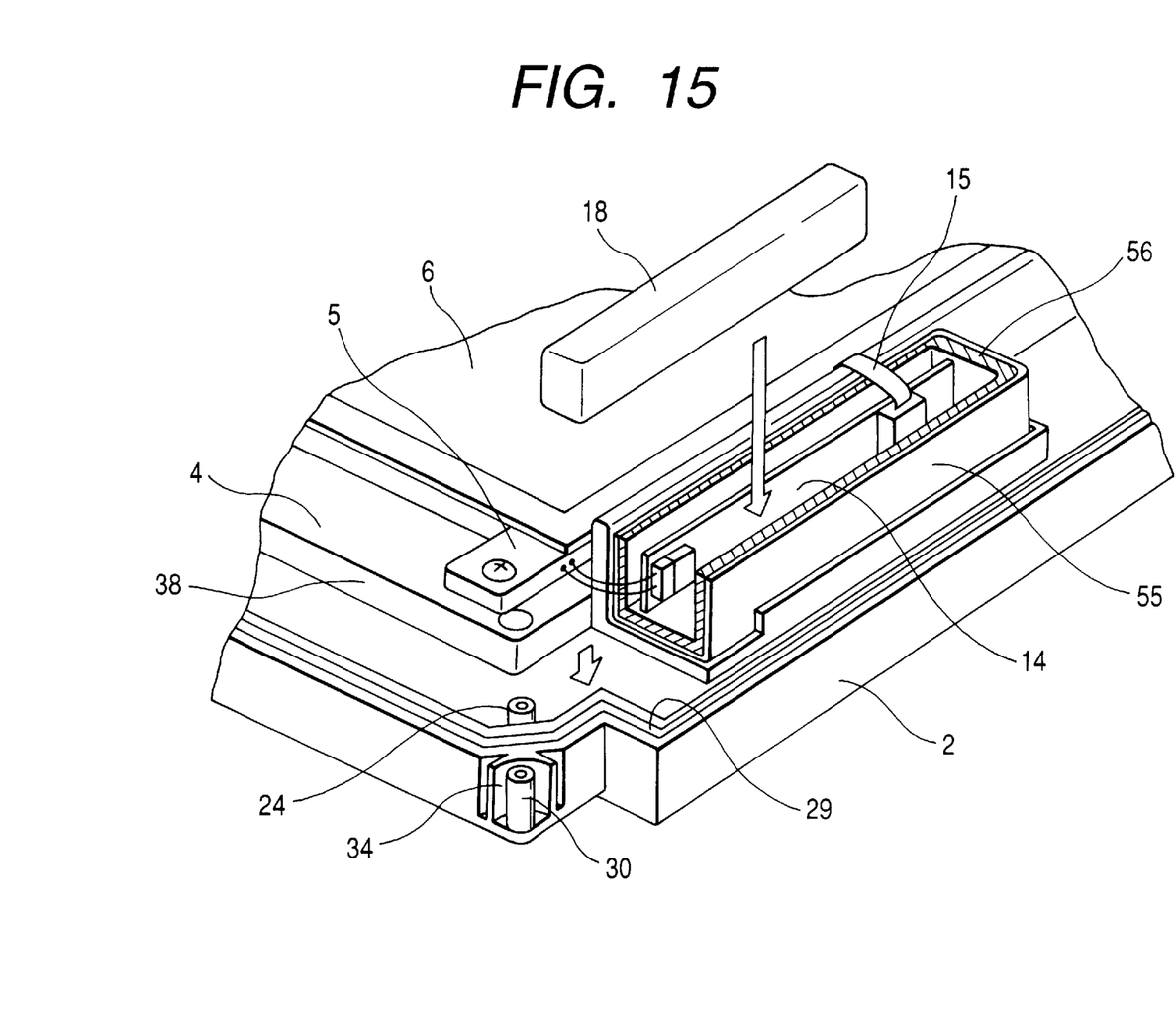
FIG. 15 is a view of the outer appearance of the upper right side of the main body showing the inside structure.

FIG. 15 is a perspective view showing the main body when an inverter insulation case 55 and the inverter board 14 are mounted on the chassis 4 having the LCD 5 with the touch panel 6. A connector 9 from the LCD 5 and a flexible cable 15 from the main board 3 are connected to the inverter board 14. The inverter insulation case 55 is provided with an insulation cushion 56 in the inner side of the inverter insulation case 55, and a member for holding the cushion 56 is provided outside of the cushion. That is, the cushion 56 sticking, for example, on a PET thin plate is put into the inverter insulation case 55 so as to come the cushion 56 inside. Therein, the PET thin plate used has an insulating property.

Then, the inverter board 14 is set into the inverter insulation case 55 with the cushion 56 from the upper side. After that, an insulation inverter cushion 18 for fixing the inverter board 14 is embedded between the inverter insulation case 55 and the inverter board 14.

Further, by forming each of the inverter insulation case 55, the stuck cushion 56 and the inverter cushion 18 using an insulation material, short circuit does not occur between the parts regardless of the material of the chassis 4 even if the whole surface is brought in contact with the inverter board 14. Furthermore, the present structure can be applied without occurrence of short circuit to an electric conductive member such as a resin chassis metal-plated for radiation noise measures or a chassis made of a light metal such as aluminum or magnesium for further improving the rigidity described above.

Further, by interposing the inverter board 14 between the cushion 56 and the inverter cushion 18, heat insulation effect of the parts mounted on the inverter board 14 can be expected. That is, this is related to how to stabilize starting of the LCD 5 in low temperature condition. In the present invention, since the cushion 56 interposing the inverter board 14 is in contact with the inverter board 14, the LCD 5 is hardly affected by the temperature around the information processing equipment because of the heat insulation effect, and accordingly there is an effect to maintain the stable display quality.

In this embodiment, the inverter board 14 is arranged in the lateral direction. However, the direction may be changed in the longitudinal direction depending on the necessity in regard to the configuration, and the installing direction is not limited to the inverter board. That is, the present invention can hold in control boards for controlling the information processing equipment and any boards for controlling and managing external peripheral units.

According to the present invention, it is possible to provide an information processing equipment having excellent shock resistance and drip-proof function.

Although the word "drip-proof" has been used in the present embodiment, the word relates to that in what is called an information processing equipment usable outdoors, the information processing equipment having a structure to prevent water from entering into the inside of the equipment. Of course, the structure meets various kinds of waterproof standards, for example, standards of rain-proof, splash-proof, watertight, water-jet-proof types according to classification of the Japan Industrial Standard. Therefore, the present invention is not limited only to, for example, the drip-proof type defined by the Japan Industrial Standard.

According to the present invention, it is possible is to provide an information processing equipment which is excellent in the shock resistance. Further, it is possible is to provide an information processing equipment which a drip-proof function better than that in the conventional technology.

What is claimed is:

1. An information processing equipment comprising:

a main body portion composed of an upper case and a lower case; and a control board and a display device disposed in said main body portion, which further comprises:

grips made of an elastic material, said grips being individually arranged in both sides of said main body portion; and core members made of a thermoplastic resin, each of said core members being provided in said grip, said elastic material comprising an elastomer having a hardness which is lower than a hardness of the thermoplastic resin in said core element.

2. An information processing equipment comprising:

a main body portion composed of an upper case and a lower case; and a control board and a display device disposed in said main body portion, which further comprises:

engaging portions in said upper case and said lower case, said engaging portion having a projecting-and-depressing shape;

grips made of an elastic material, said grips being individually arranged in both sides of said main body portion; and core members made of a thermoplastic resin, each of said core members being provided in said grip, said elastic material comprising an elastomer having a hardness which is lower than a hardness of the thermoplastic resin in said core element.

3. An information processing equipment comprising:

a main body portion composed of an upper case and a lower case; and a control board and a display device disposed in said main body portion, which further comprises:

engaging portions in said upper case and said lower case, said engaging portion having a labyrinth structure;

grips made of an elastic material, said grips being individually arranged in both sides of said main body portion; and grip core members made of a thermoplastic resin, each of said grip core members being provided in said grip, said elastic material comprising an elastomer having a hardness which is lower than a hardness of the thermoplastic resin in said core element.

4. An information processing equipment comprising:

a main body portion composed of an upper case and a lower case; and a control board and a display device disposed in said main body portion, which further comprises:

grips made of an elastic material, said grips being individually arranged in both sides of said main body portion;

grip core members made of a thermoplastic resin, each of said grip core members being provided in said grip;

a strap hole in said grip or said grip core member;

a boss portion in said lower case;

a boss engaging portion in said upper case, said boss engaging portion being engaged with said lower case; and a tunnel-shaped strap path formed by engaging said lower case with said upper case.

5. An information processing equipment comprising:

a main body portion composed of an upper case and a lower case; and a control board and a display device disposed in said main body portion, which further comprises:

engaging portions in said upper case and said lower case, said engaging portion having a projecting-and-depressing shape;

grips made of an elastic material, said grips being individually arranged in both sides of said main body portion;

grip core members made of a thermoplastic resin, each of said grip core members being provided in said grip;

a strap hole in said grip or said grip core member;

a boss portion in said lower case;

a boss engaging portion in said upper case, said boss engaging portion being engaged with said lower case; and a tunnel-shaped strap path formed by engaging said lower case with said upper case.

6. An information processing equipment comprising:

a main body portion composed of an upper case and a lower case; and a control board and a display device disposed in said main body portion, which further comprises:

engaging portions in said upper case and said lower case, said engaging portion having a projecting-and-depressing shape;

grips made of an elastic material, said grips being individually arranged in both sides of said main body portion;

grip core members made of a thermoplastic resin, each of said grip core members being provided in said grip; and a pen storing portion for storing a pen, said pen storing portion being arranged in said grip, said elastic material comprising an elastomer having a hardness which is lower than a hardness of the thermoplastic resin in said core element.

\* \* \* \* \*